United States Patent [19]
Hashimoto et al.

[11] 3,866,102
[45] Feb. 11, 1975

[54] METHOD AND SYSTEM OF SERVO CONTROL FOR SPEED CONTROL FOR VEHICLES

[75] Inventors: Hiroshi Hashimoto; Tetsuo Abe; Masao Suzuki, all of Aichi-ken, Japan

[73] Assignee: Sanyo Machine Works Ltd., Aichi-ken, Japan

[22] Filed: Aug. 1, 1973

[21] Appl. No.: 384,694

Related U.S. Application Data

[63] Continuation of Ser. No. 79,772, Oct. 12, 1970, abandoned.

[52] U.S. Cl.............. 318/609, 318/146, 318/158, 290/14, 180/6.5
[51] Int. Cl. .......................................... G05b 11/36
[58] Field of Search............ 318/146, 158, 609–610; 290/14; 180/6.5

[56] References Cited
UNITED STATES PATENTS

| | | | |
|---|---|---|---|
| 3,263,142 | 6/1966 | Adoutte et al.................... | 290/14 X |
| 3,551,685 | 12/1970 | Corry............................. | 318/158 X |

*Primary Examiner*—T. E. Lynch
*Attorney, Agent, or Firm*—Hall & Houghton

[57] ABSTRACT

The invention makes it possible (1) to run a vehicle such as automobile at a fixed speed, (2) to regulate running vehicle speed so that as soon as it exceeds a set vehicle speed it is automatically brought back to said set vehicle speed, and (3) to control running vehicle speed from outside the vehicle by means of electric waves regardless of driver's intention.

3 Claims, 12 Drawing Figures

HIROSHI HASHIMOTO,
TETSUO ABE,
MASAO SUZUKI,
INVENTORS

HIROSHI HASHIMOTO,
TETSUO ABE,
MASAO SUZUKI,

INVENTORS

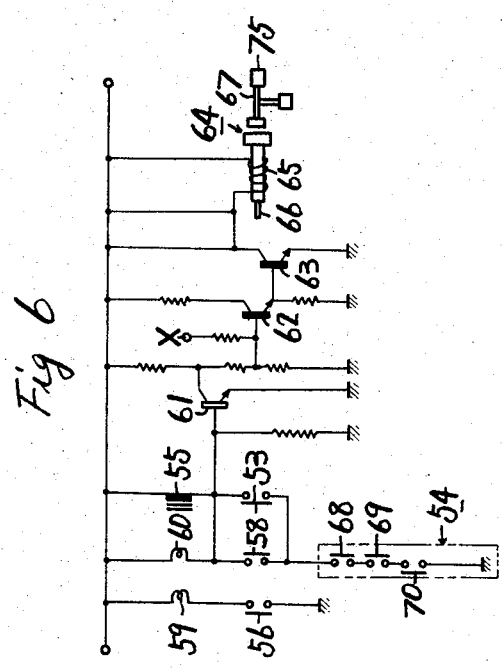
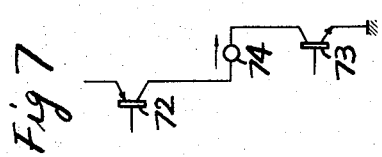
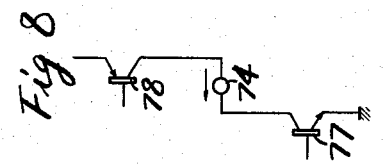

HIROSHI HASHIMOTO,
TETSUO ABE,
MASAO SUZUKI,
INVENTORS

METHOD AND SYSTEM OF SERVO CONTROL FOR SPEED CONTROL FOR VEHICLES

This is a continuation of application Ser. No. 79,772 filed Oct. 12, 1970.

BACKGROUND OF THE INVENTION a. Field of the Invention

The present invention relates to a method end system for speed control for vehicles.

b. Description of the Prior Art

There have already been made various inventions concerning automobile speed control system. We ourselves have previously made various suggestions on such system. These prior art devices are based on a method comprising detecting the running vehicle speed, comparing it with a predetermined set vehicle speed and rotating a motor in the forward or reverse direction in accordance with the speed difference to further open or close the throttle valve connected to the motor shaft so that the running vehicle speed may be always equal to the set vehicle speed. In this case, the method used to rotate the motor comprises changing over the polarity of the voltage across the motor terminals thereby changing the direction of rotation of the motor. With this method, however, since the motor is rotated at full speed, there is limitation on the enhancement of constant-speed retention performance and there is a problem about the durable time of the device in connection with the life of the relay contacts. As a result, these prior art devices are not so suitable as to fully meet the desires.

SUMMARY OF THE INVENTION

The present invention provides an improved system comprising a motor for further opening and closing the throttle valve, said motor being of the linear servo type adapted to be rotated at a speed proportional to a difference between running and set vehicle speeds thereby enhancing constant-speed retention performance, a compensating circuit for improving the transient response characteristics at the time of constant-speed running, means whereby changeover from the usual running state to a running state established by the use of the present system is automatically effected when the difference between running and set vehicle speeds is zero, means for effecting changeover between constant-speed running and overspeed-limiting running, and a transmitter installed on a road whereby the speed-setting of the present system and changeover between constant-speed running and overspeed-limiting running are automatically effected by electric waves emitted from said transmitter cooperating with a receiver installed in the vehicle.

BRIEF DESCRIPTION OF THE INVENTION

In the accompanying drawings illustrating preferred embodiments of the invention:

FIGS. 4 through 6 show another embodiment corresponding to the circuit shown in FIG. 1, wherein FIG. 4 shows a prestage circuit, FIG. 5 shows an intermediate stage circuit including a power source circuit and FIG. 6 shows a last stage circuit;

FIGS. 7 and 8 illustrate the operation of the circuit shown in FIG. 5;

Figure 5:
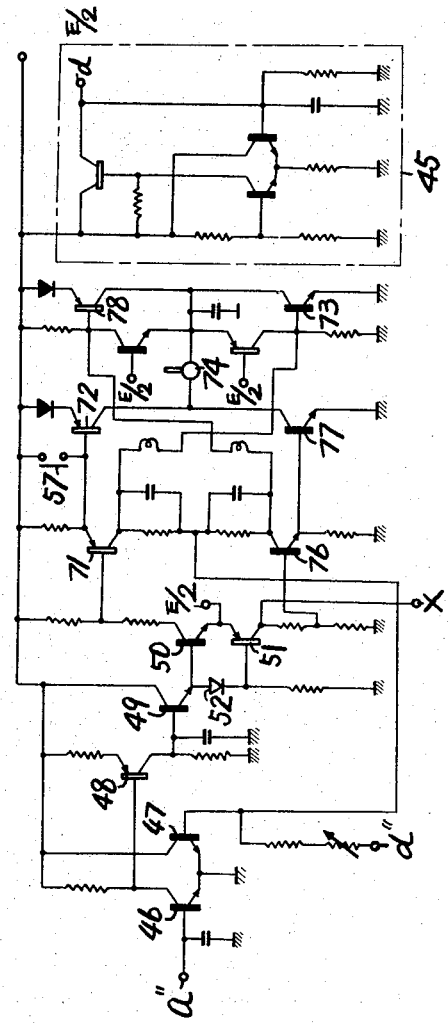
Figure 4:
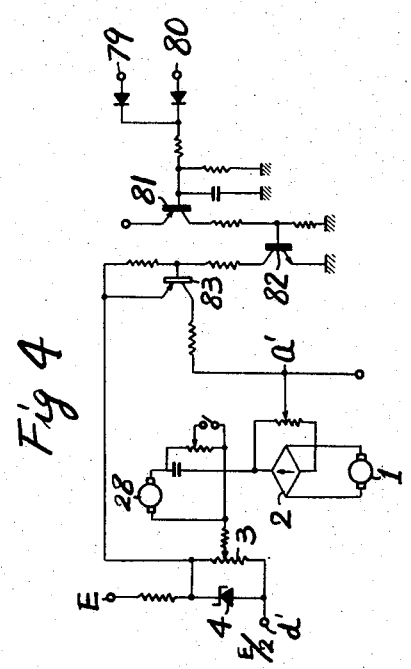
Figure 10:
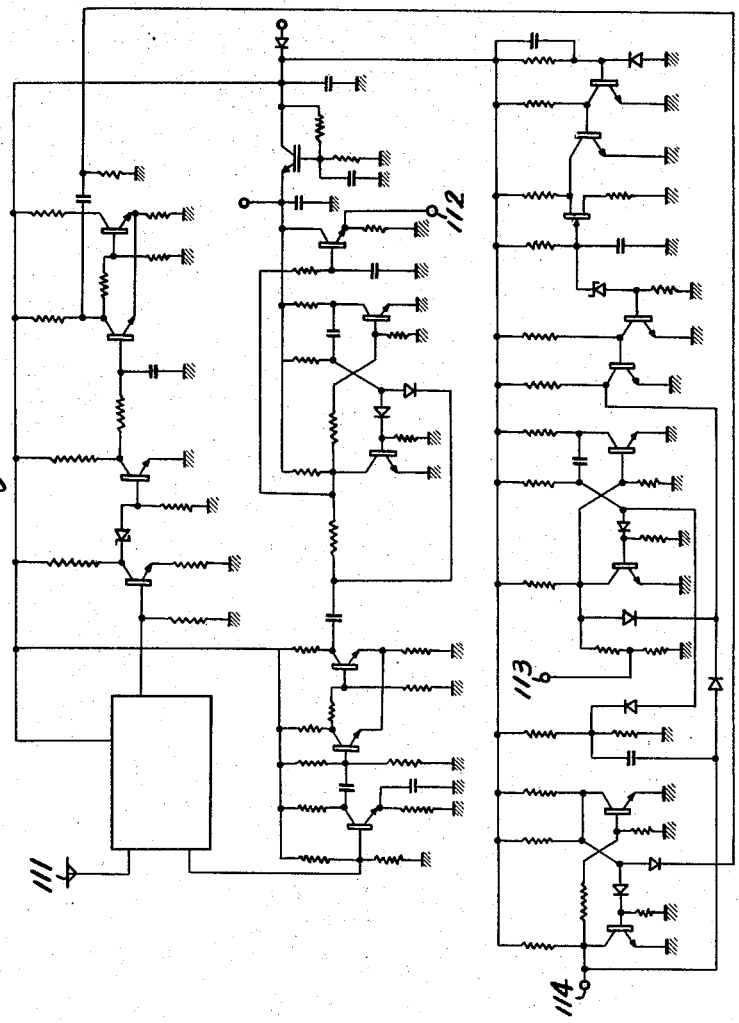
Figure 9:
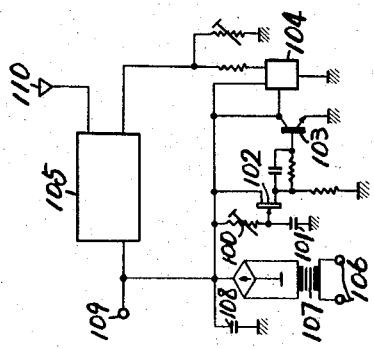
Figure 11:
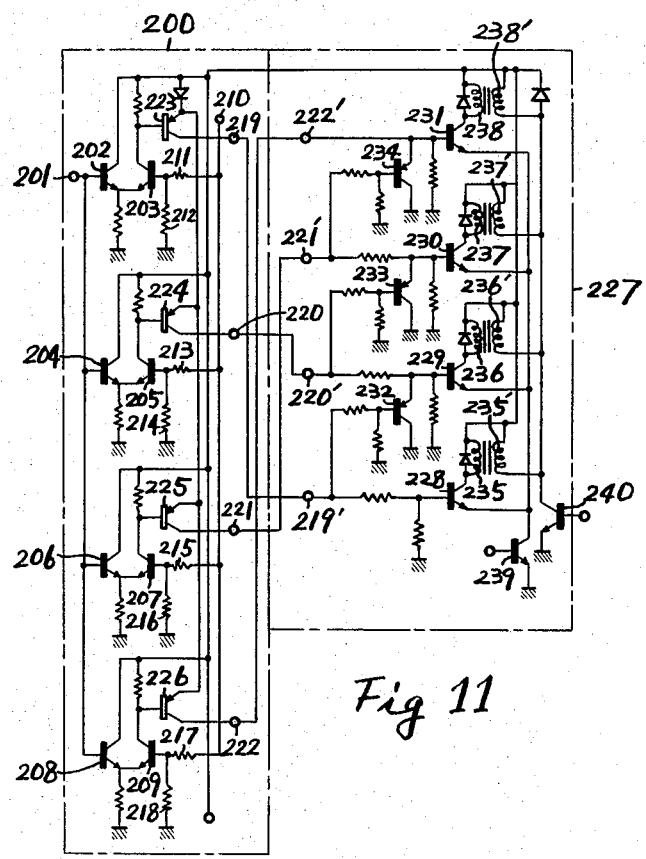
Figure 12:
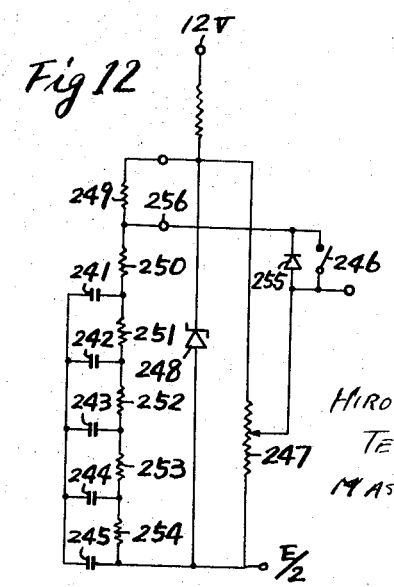

FIGS. 9 through 12 show means for operating the means shown in FIGS. 4 through 6 outside a vehicle by electric waves, wherein FIG. 9 is a circuit diagram for a transmitter installed outside the vehicle for transmitting control signals, FIG. 10 is a circuit diagram for a receiver installed in the vehicle, FIG. 11 is a signal discriminating and selective relay driving circuit diagram, and FIG. 12 is a circuit diagram showing the contacts of a selective relay.

DESCRIPTION OF THE PREFERRED EMBODIMENTS

Figure 1:
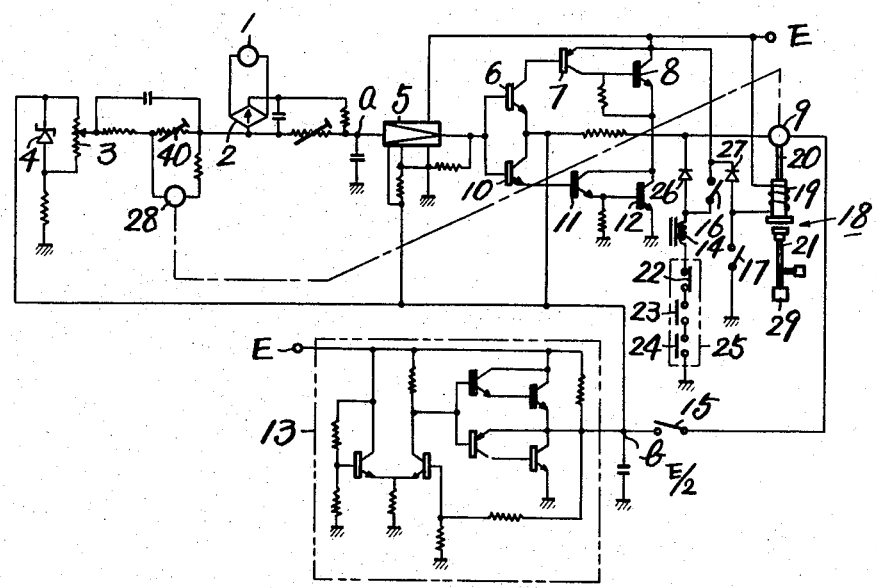
FIG. 1 is a circuit diagram for exclusive use for providing constant-speed running.

The circuit shown in FIG. 1 is speed control means for exclusive use for constant-speed running. It will be installed in a vehicle such as an automobile. The character E represents power source voltage. Thus, E/2 represents half the voltage. The running vehicle speed is converted into an a-c voltage by an a-c generator 1. This a-c voltage is rectified by rectifier means 2 to provide a d-c output. On the other hand, a constant voltage determined by a Zener diode 4 is permanently impressed across the terminals of a variable resistor 3 serving for the setting of vehicle speed. Therefore, a constant voltage dependent on the set vehicle speed can be obtained from the intermediate tap of said variable resistor 3. The set voltage is compared with a voltage dependent of the running vehicle speed and the difference in voltage is utilized as the input to a servo amplifier 5. It is so arranged that the polarity of the set voltage is negative as viewed with the E/2 voltage as the reference. On the way the set valtage is led to the servo amplifier 5, the running vehicle speed voltage produced by the a-c generator 1 is applied thereto with its polarity opposite from that of the set voltage. Therefore, it is seen that the difference between set and running vehicle speeds, after being converted into a voltage, is applied to the servo amplifier 5 as its input. Thus, when (running vehicle speed) > (set vehicle speed), (input voltage) > (E/2 voltage) and when (running vehicle speed) < (set vehicle speed), (input voltage) < (E/2 voltage). This deviation signal is amplified to provide an output which, in turn, is used to actuate transistors in the subsequent circuit. That is, when (deviation signal) > (E/2 voltage), transistors 6, 7 and 8 are rendered conductive so that a voltage $V_1$ which is greater than E/2, plus E/2 is applied across the terminals of a servomotor 9. Reversely, when (deviation signal) < (E/2 voltage), transistors 10, 11 and 12 are rendered conductive so that a voltage $V_2$ which is less than E/2. plus E/2 is applied across the terminals of the servomotor 9. In this way, the servomotor 9 has a voltage $V_1 - E/2$ or $V_2 - E/2$ applied thereto. Since the polarities of these voltages are mutually opposite, the servomotor is rotated in the forward or reverse direction. Such forward and reverse rotation of the servomotor will cause the opening and closing of a throttle valve 29 so that the vehicle will be accelerated or decelerated in accordance with the degree of opening of the throttle valve.

Further, the E/2 voltage is produced in a power circuit 13 by closing a power switch (not shown) and appears at point *b*.

In the circuits of the above-mentioned arrangement, when the power switch is closed, the E/2 voltage is produced in the power circuit 13 and this voltage E/2, which appears at point b, actuates a relay 14 so that its contacts 15, 16 and 17 are closed. The closing of the contact 15 sets the constant-running circuit in readiness for operation. The contact 18 serves for the self-holding of the relay circuit. The closing of the contact 17 admits an electric current to the coil 19 of a control clutch 18 to actuate the latter thereby establishing engagement between the servomotor shaft 20 and the throttle valve shaft 21. Further, the relay circuit 14 includes a normally closed contact 22 adapted to be opened at the time of stepping on the brake, a normally opened contact 23 adapted to be closed at the time of clutch engagement, and a normally opened contact 24 adapted to be closed at the time of top-gear engagement, said contacts being connected in series and constituting a resetting circuit 25. Therefore, the operation of the relay 14 is conditional on said three contacts being all closed. Until one of said contacts 22, 23 and 24 is opened, the relay 14 is kept energized and the control clutch 18, of course, is in operation.

Under these conditions, if the differential voltage becomes $V_1 - E/2$, then the transistors 6, 7 and 8 are successively rendered conductive and the servomotor 9 is thereby rotated in the forward direction at a speed dependent on the amount of electricity proportional to the difference between the differential voltage and the E/2 voltage to further close the throttle valve thereby to decelerate the speed. Conversely, if the differential voltage becomes $E/2 - V_2$, then the transistors 10, 11 and 12 are successively rendered conductive and the servomotor 9 is thereby rotated in the reverse direction at a speed dependent on the amount of electricity proportional to the difference between the E/2 voltage and the differential voltage to further open the throttle valve 29 thereby to accelerate the vehicle. A diode 26 placed in the relay circuit serves to automatically complete the circuit constant-speed. That is, it becomes conductive at a voltage in the vicinity of the E/2 voltage to actuate the relay 14. Therefore, in cases where the voltage is less than E/2, the relay will not operate even if this circuit is brought into the constant-running conditions, Further, a diode 27 serves to couple the relay terminals to the servo amplifier.

The linear servo system described as the feature of the present invention is a system in which $V_1 - E/2$ of $V_2 - E/2$ varies in proportion to the amount of differential signal and the rotational speed of the servomotor varies in proportion thereto to change the opening and closing speed of the throttle valve.

Figure 2:
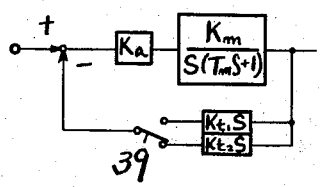
FIG. 2 is a block diagram of an invariable factor changeover circuit to be incorporated in the circuit shown in FIG. 1.
Figure 3:
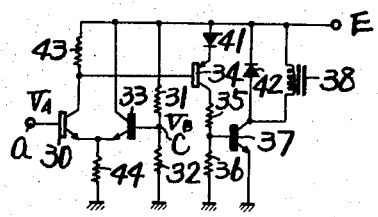
FIG. 3 is a layout of said invariable factor changeover circuit.

A circuit shown in FIG. 2 and 3 are incorporated in the constant-running exclusive circuit shown in FIG. 1 to improve transient response characteristics. When there is a great difference between set vehicle speed and running vehicle speed, transient characteristics to follow the set vehicle speed will become worse. In other words, too great a vehicle speed variation would make the FIG. 1 circuit unfit for practical use. In general, the existence of a great difference between set vehicle speed and running vehicle speed is found in various cases among which are:

A first case where when the vehicle is running at a set vehicle speed, the driver makes a sudden drastic change in said set vehicle speed, and a second case where the running vehicle speed shifts greatly from the set vehicle speed because of disturbances such as road gradient and a gust of wind.

Further, when a speed control system to be later described is used, it is necessary to ensure that there will be no great difference between set vehicle speed and running vehicle speed. Therefore, there will be inconvenience in that the driver has to constantly increase and decrease the vehicle speed to a value in the vicinity of the set vehicle speed. It is the FIG. 3 circuit that solves this problem. The FIG. 3 circuit is used by being incorporated in the constant-running exclusive circuit of FIG. 1, and it is necessary to add the following component to the FIG. 1 circuit.

In FIG. 1 circuit, a minor feedback circuit is formed and the number of revolutions of the servomotor for opening and closing the throttle valve is converted into a voltage, which is then negatively fed back to the input of the servo amplifier 5. This measure ensures that as the number of revolutions of the servomotor increases, the voltage to be negatively fed back increaser correspondingly. Thus the terminal voltage on the servomotor 9 decreases, so that the number of revolutions thereof decreases. This means that the velocity generator 28 (FIG. 1) driven by the servomotor 9 has a damping action. Therefore, the rotational speed of the servomotor 9 depends on the voltage fed back to the servo amplifier input by the velocity generator 28 in the minor feedback circuit.

The improvement of transient response characteristics, which is an object of the present invention, can be achieved by regulating the opening and closing speed of throttle valve 29 (see FIG. 1).

After all this means that it can be achieved by regulating the voltage feedback ratio provided by the velocity generator 28. Thus, when the speed difference is great, it is good to select the constant Kt such that it increases the rotational speed of the servomotor 9, whereas when the speed difference is small, it is good to select the constant Kt such that it decreases the rotational speed of the servomotor 9. Such selection may be achieved by changing over the minor feedback circuit by the use of a relay as shown in FIG. 3. The changeover circuit for this purpose will now be described with reference to FIG. 3.

The base of a transistor 30 in FIG. 3 is connected to point a shown in FIG. 1. By this measure, the differential voltage VA corresponding to the difference between the set vehicle speed and the running vehicle speed becomes the input of the FIG. 3 circuit. Point C in FIG. 3 illustrates that the potential difference between the E power source and the earth is divided by resistors 31 and 32 to maintain a voltage $V_E$ constant with respect to the earth potential. In this circuit, transistors 30 and 31 have the same characteristics. In order for the transistors 30 and 33 to become conductive, it is necessary that the voltage drop between the base and emitter thereof be above a certain valve. Let Vbe represent this value, then the condition for rendering the transistor 30 or 33 is that $V_A - V_C >$ Vbe or $V_B - V_C >$ Vbe, respectively. Assuming that the transistor 33 is now conducting, then $V_C = V_B -$ Vbe. At this time, $V_A - V_C =$ VA $- (V_B -$Vbe$) =$ Vbe $- (V_A - V_B)$. If $V_A < V_B$, then $V_A - V_C <$ Vbe, and the transistor 30 is not rendered conductive. On the other hand, if $V_A > V_B$, then $V_A - V_C >$ Vbe, and the transistor 30 is rendered conductive. When the transistor 30 is rendered conductive, it follows that $V_B - V_C = V_B - (V_A -$Vbe$) =$ Vbe $-(V_B - V_A) < V_{be}$. Therefore, the transistor 33 ceases to be conductive. Thus, it follows that when $V_A > V_B$, the transistor 30 becomes conductive and when $V_A < V_B$, the transistor 30 does not become conductive. In other words, when the differential voltage $V_A$ corresponding to the difference between the set vehicle speed and the running vehicle speed is higher than the voltage $V_B$, which is the changeover reference, the transistor 30 will become conductive. When the transistor 30 becomes conductive, a voltage is produced across the emitter and base of the transistor 34 so that the transistor 34 becomes conductive.

As a result of the transistor 34 becoming conductive, a collector current flows through the resistors 35 and 36, so that the base potential of the transistor 37 is caused to have a higher value with respect to the earth potential. In this way a potential difference is produced across the base and emitter of the transistor 37, so that the transistor 37 becomes conductive. As a result of the transistor 37 becoming conductive, a collector current flows, driving a relay 38 to effect a changeover of a contact 39 shown in FIG. 2. In short, when $V_A > V_B$, $Kt_1S$ is selected as minor feedback by the contact 39, and when $V_A < V_B$, $Kt_2B$ is selected as minor feedback. That is, it follows that in the FIG. 1 circuit a bariable resistor 40 is changed over. In addition, in FIG. 2, Ka is a servo amplifier gain constant; Km is a servomotor gain constant; S is Laplace's operator; and Tm is a time constant for the servomotor. Further, in FIG. 3, the numerals 41 and 42 denote diodes and the numerals 43 and 44 denote resistors.

FIGS. 4 through 6 show another embodiment of a speed control circuit. A feature of this speed control circuit is that the changeover between constant-speed running and overspeed-limiting running is easy. In the FIG. 4 circuit, a section shown in the left half from point $a'$ serves to derive the differential voltage corresponding to the difference between running vehicle speed and set vehicle speed and is constructed on the same principles as the circuit shown in the left half from point $a$ in FIG. 1. Therefore, the description of its operation will be omitted. Further, like numerals denote like parts. Thus the differential voltage corresponding to the difference between running vehicle speed and set vehicle speed appears at point $a$ in FIG. 4.

FIG. 1 is a diagram of a combination circuit consisting of a differential-voltage amplifying circuit, a servomotor circuit and a power source circuit for producing E/2 voltage. Closing a power switch (not shown) will actuate a power source circuit 45 in FIG. 5 to produce E/2voltage at point $d$. This E/2 voltage is fed to point $d'$ in FIG. 4 and also to point $d''$ in FIG. 5. The differential voltage corresponding to the difference between running vehicle speed and set vehicle speed is derived in the circuit shown in the left half from point $a'$ in FIG. 4. The differential voltage at point $a'$ is fed to point $a''$ in FIG. 5. The differential voltage fed to point $a''$ is compared with the E/2 voltage fed to point $a''$ by means of transistors 46 and 47 constituting a differential amplifier, the differential voltage being amplified by transistors 48 and 49. When the difference voltage is greater than the E/2 voltage, one transistor 50 becomes conductive. Reversely, when the difference voltage is less than the E/2 voltage, the other transistor 51 becomes conductive. In addition, the numeral 52 denotes a diode serving to prevent the transistors 50 and 51 from becoming conductive at the same time.

In the circuit of the above-mentioned arrangement, when it is desired to set said circuit for constant-speed running system, a constant-speed setting push-button switch 53 in FIG. 6 may be closed. Thus, closing the switch 53 actuates a relay 55 on condition that a relay circuit 54 is completed. Its relay contact 55 opens a contact 56 in FIG. 6 and closes a contact 57 in FIG. 5. It also closes a contact 58 in FIG. 6. The opening of said contact 58 puts out an over-speed-limiting running indicating lamp 58. The closing of the contact 58 puts on a constant-speed running indicating lamp 60 and allows the relay circuit to be self-held. The opening of the contact 57 in FIG. 5 sets the FIG. 5 circuit in a condition making constant-speed running possible. Further, the closing of said constant-speed setting push-button switch 53 renders transistors 61, 62 and 63 successively conductive to energize the coil 65 of a control clutch 64 to actuate said clutch, thereby coupling a servomotor shaft 66 and a throttle valve shaft 67. Thus, henceforth, the control clutch 64 remains energized to hold the two shafts together until one of the contacts 68, 69 and 70 in the resetting circuit is opened or until the power source switch is opened. In this condition if the running speed of the vehicle becomes slower than the set vehicle speed, the transistor 50 in FIG. 5 is actuated, followed by the actuation of transistors 71, 72 and 73. As a result, a circuit for a servomotor 74 shown in FIG. 7 is completed, so that the servomotor 74 is rotated in the forward direction in which a throttle valve 75 shown in FIG. 6 is further opened, thereby increasing the vehicle speed. Reversely, if the running speed of the vehicle becomes faster than the set vehicle speed, the transistor 51 in FIG. 5 is actuated, followed by the actuation of transistors 76, 77 and 78. As a result, a servomotor circuit shown in FIG. 8 is completed, so that the servomotor 74 is rotated in the reverse direction in which the throttle valve 75 is further closed, thereby decelerating the vehicle.

The above refers to a case where the circuits shown in FIGS. 5 and 6 has been set for constant-speed running system, but when it is desired to set it for overspeed-limiting running system, this can be achieved by releasing the constant-speed running system with the power source switch maintained in its closed position. That is, it is necessary to open the constant-speed setting push-button switch 53 in FIG. 6 to render the relay 56 inoperative.

Thereby, the contact 66 is closed to put on the lamp 59, while the contact 58 is opened to put out the lamp 60, and the transistors 61, 62 and 63 in FIG. 6 are rendered non-conductive to disengage the clutch 64 and the contact 57 in FIG. 5 is closed to set the FIG. 5 circuit for over-speed-limiting running system. Thus even when the running vehicle speed becomes slower than the set vehicle speed and hence the differential voltage becomes greater than the E/2 voltage, since the base potential of the transistor 72 is equal to the power source voltage E, the transistor 72 will not be actuated and hence the FIG. 7 circuit will not be completed. Therefore, the vehicle will not be accelerated. Reversely, when the running vehicle speed becomes faster than the set vehicle speed and hence the differential voltage becomes less than the E/2 voltage, the transistor 51 is rendered conductive to complete the FIG. 8 circuit, thereby driving the servomotor 74 in a vehicle-decelerating direction. At this time, the emitter voltage of the transistor 51 is applied to the base of the transistor 62 in FIG. 6. Thus, the transistors 62 and 63 are actuated to actuate the control clutch 64. As a result, the above-mentioned reverse rotation of the servomotor decelerate the vehicle.

In the portions of the circuits of FIGS. 1 and 4 where the differential voltage is derived, since the direction of the Zener diode in one portion is reversed from that in the other portion, the magnitude of the differential voltage with respect to the F/2 voltage is likewise reversed. That is, in the case of the FIG. 1 circuit, when the running vehicle speed is faster than the set vehicle speed, the differential voltage becomes greater than the E/2 voltage, whereas in the case of the circuits of FIGS. 4 and 5, when the running vehicle speed is faster than the set vehicle speed, the differential voltage becomes less than the E2 voltage. Further, by incorporating the circuit shown in the right half of FIG. 4 from point $a'$ and by utilizing the action of the winker of the vehicle when passing another vehicle ahead, it is possible to somewhat raise the differential voltage at point $a$ to allow acceleration at the time of passing ahead. Thus, in FIG. 4, when the winker is turned on, a plus voltage will appear across the terminals 79 and 78 of the winker. As a result, transistors 81, 82 and 83 are successively rendered conductive whereby the potential at point $a$ becomes somewhat higher than when the winker is not turned on. Therefore, it becomes possible to accelerate the vehicle more than when the winker is not turned on.

The types of speed control systems described so far, namely, one for exclusive use for constant-speed running shown in FIG. 1 and the other which is capable of changeover between constant-speed running and overspeed-limiting running shown in FIGS. 4 through 6, employ the linear servo system wherein $V_1 - E/2$ and $E/2 - V_2$ vary proportionally to the magnitude of differential signals and the rotational speed of the servomotor varies proportionally thereto to vary the opening and closing speed of the throttle valve.

With the two types of speed control systems, the setting of vehicle speed may be manually effected by the driver, but the addition thereto of means to be presently described makes it possible to set vehicle speed forcibly from the outside regardless of the driver's intention by the use of electric waves. That is, this may be achieved by controlling the vehicle speed-setting variable resistor 3 in the circuit of FIG. 1 or FIG. 4 by the use of electric waves.

FIG. 9 shows the circuit of a transmitter to be installed on a road or thereabouts. In accordance with a time constant determined by a vehicle speed-setting variable resistor 100 and by a capacitor 101, a unijunction transistor 102 is rendered conductive and non-conductive, and in accordance with its repetition period, a transistor 103 and also a flip-flop 104 are driven to cause a transmitter unit 105 to transmit signals. Therefore, by operating the variable resistor 100 to vary the oscillation frequency of the flip-flop, it is possible to transmit any desired signal. In addition, the numeral 106 denotes a-c power source terminals; 107, a transformer; 108, a rectifier; 109, d-c power source terminals; and the numeral 110 denotes an antenna.

Among the various elements possessed by said transmitted signal, the necessary information is the pulse period T. That is, the period T of this signal represents the designated vehicle speed. Therefore, by detecting the period T by a receiver to be presently described, it is possible to know the valve of the vehicle speed designated by the signal. The period T is detected by a receiver, e.g., of FIG. 1 construction installed in the vehicle to produce an analog quantity or voltage dependent on the period T. The analog quantity is then converted into a digital quantity by an A-D converter to be presently described. A relay to be actuated is selected by the digital value.

Thus, the signal from the transmitter is received by the antenna 111 of the receiver shown in FIG. 10 to derive an analog quantity or voltage at a terminal 112 in accordance with the period T of the transmitted signal. Simultaneously therewith, a gate signal and a resetting signal are derived at terminals 113 and 114, respectively. In addition, the receiver shown in FIG. 10 is known, so that the detailed description thereof will be omitted.

As described above, the information about the value of the vehicle speed demanded by the transmitter is produced as an analong quantity at the terminal 112 of the receiver 112 shown in FIG. 10. This analog quantity (voltage) is impressed on the terminal 201 of an A-D converter circuit 200 included in the pre-stage in FIG. 11. Transistors 202 and 203; 204 and 205; 206 and 207; and 208 and 209 in the A-D converter circuit respectively constitute differential applifier circuits. The bases of the transistors 203, 205, 207 and 209 are connected to a terminal 210 leading to the power source and have impressed thereon stabilized voltages Vb203, Vb205, Vb207 and Vb209, respectively. These base potentials are predetermined by resistors 211 and 212; 213 and 214; 215 and 216; and 217 and 218, respectively, such that Vb203 > Vb205 > Vb207 > Vb209. The received signal Vi that has reached the terminal 201 and has been converted into a d-c voltage is impressed on the bases of the transistors 202, 204, 206 and 208 of the respective differential amplifier circuits. Assuming that Vb203>Vi>Vb205>Vb207>Vb209 and letting Veb represent the potential difference between the emitter and base of the transistor 203, the potential difference necessary for the conduction of the transistor 202 is Vb203 - Veb. however, since Vb203>Vi, Vi - Veb is not enough to render the transistor 202 conductive. In short, in cases where Vb203 - Vi>o, Vb203 - Vi>0, Vb207 - Vi>0 and Vb209 - Vi>0, no output will appear at the output terminals 219, 220, 221 and 222 of the differential amplifier circuits. For example, if the received signal Vi is such that Vb203>Vb205>Vi>Vb207>Vb209, then the transistors 203 and 205 are rendered non-conductive whereas the transistors 205 and 209 are rendered conductive, the other transistors 207 and 209 being rendered conductive. Therefore, PNP transistor 223 and 224 are rendered non-conductive whereas PNP transistors 225 and 226 are rendered non-conductive. As a result, outputs appear at the output terminals 221 and 222. It is to be noted that the output terminals 219, 220, 221 and 222 of the A-D converter circuit are connected to the input terminals 219', 220', 222' and 222' of a relay selecting circuit 227 included in the last stage in FIG. 11, respectively. Therefore, the voltages at the output terminals 221 and 222 of the pre-stage are impressed on the input terminals 221' and 222' of the last stage. Since the voltage impressed on the terminal 221' is used as the base voltage for transistors 230 and 234, these transistors are rendered conductive, with the result that the voltage applied at the terminal 222' is earthed because of the conduction of the transistor 234'. Therefore, the transistor 231 will not be actuated despite the fact that a voltage has been impressed on its base. In addition, since there is no output at the terminals 219 and 220 of the A-D converter circuit, no voltage has been impressed on the terminals 219' and 220' of the relay selecting circuit 227 and naturally the transistors 228, 232, 229 and 233 are not conducting.

The net result is that the transistor 230 alone in conducting. At this time, the gate signal produced at the terminal 113 of the receiver (FIG. 10) has reached the base of a transisteor 239, so that said transistor 239 is rendered conductive. The conduction of the transistor 239 cooperating with the conduction of the transistor 230 completes the circuit of a setting relay 237, so that this relay 237 alone operates in accordance with the received signal Vi.

Next, if the received signal Vi is such that Vb203 Vb205 Vb207 Vi Vb209, an output appears at the terminal 222 alone for the same reasons as described above, so that the transistor 231 alone of the relay selecting circuit 227 is rendered conductive, cooperating with the conduction of the transistor 239 to operate a setting relay 238 alone. Further, if the received signal Vi is such that Vb203>Vi>Vb205>Vb207>Vb209, outputs appear at the output terminals 220, 221 and 222. These outputs are impressed on the terminals 220', 221' and 222' of the last stage. However, since the voltage at the terminal 220' renders the transistor 233 conductive and the voltage at the terminal 221' renders the transistor 234 conductive, the potentials at the terminals 221' and 222' become equal to the earth potential because of said transistors 233 and 234. As a result, only a setting relay 236 corresponding to the transistor 229 operable by the voltage appearing at the terminal 220 will operate.

When one setting relay is selected in the above-mentioned manner, a corresponding one of the contacts 241, 242, 243 and 244 shown in FIG. 12 is closed and a voltage dependent on the transmitted signal is produced at a limitation intervening point 256. The voltage is then amplified by an amplifier to drive a servomotor to control the engine. In FIG. 12, the numeral 247 denotes a contact operable when a speed-limiting signal arrives; 247, a manually operable variable resistor; 248, a Zener diode; 249, 250, 251, 252, 253 and 254, resistors; and the numeral 255 denotes a diode.

In FIG. 11, the numerals 253', 236', 237' and 238' denote resetting relays.

When a resetting signal applied at the terminal 239 renders a transistor 240 conductive, all the resetting relays will be operated in unison.

Whiles there have been described herein what are at present considered preferred embodiments of the several features of the invention, it will be obvious to those skilled in the art that modifications and changes may be made without departing from the essence of the invention.

It is therefore to be understood that the examplary embodiments thereof are illustrative and not restrictive of the invention, the scope of which is defined in the oppended claims and that all modifications that come within the meaning and range of equivalency of the claims are intended to be included therein.

We claim:

1. A system for speed control for vehicles, comprising means for producing d-c voltage proportional to the speed of a running vehicle, means for producing d-c voltage proportional to a desired pre-selected vehicle speed, said voltages being electrically connected with each other in mutually opposite polarity relationship, means to compare a difference in voltage between the two, a servo amplifier electrically coupled at its input end to said voltage comparison means, a servomotor electrically coupled by a driving circuit with the output end of said servo amplifier to drive said servomotor, said driving circuit being changed over by transistors operable depending upon the polarity of the output from said servo amplifier, a control clutch having a coil circuit operatively connected between the rotatable shaft of said servomotor and the rotatable shaft of a throttle valve for effecting the engagement and disengagement therebetween, the coil circuit of the control clutch being controlled by a relay circuit, said relay circuit including a normally closed contact adapted to be opened at the time of stepping on the brake of the vehicle, a normally opened contact adapted to be closed at the time of vehicle clutch engagement and a normally opened contact adapted to be closed at the time of the top-gear engagement of said vehicle when in motion, said contacts being connected in series, a diode positioned in said relay circuit and adapted to be rendered conductive by a reference voltage to drive said relay circuit whereby when a voltage substantially equal to the reference voltage is obtained, a relay is actuated to drive the control clutch and henceforth the forward and reverse rotation of the servomotor increases or decreases to the degree corresponding with the opening of the throttle valve to accelerate or decelerate the vehicle until the vehicle speed is equal to the desired speed, said system further including a comparison circuit operatively associated with the voltage producing means of the set vehicle speed and the voltage producing means of the vehicle running speed to compare the set vehicle speed and the running vehicle speed with each other and to produce a deviation voltage therebetween, comparing said deviation voltage with a change-over reference voltage, adjusting a minor feedback circuit on the basis of the result of such comparison so that when the speed difference therebetween is great, a speed feedback constant effective to increase the rotational speed of the servomotor is selected and when the speed difference is small, a speed feedback constant effective to decrease the rotational speed of the servomotor is selected.

2. A system for speed control for vehicles, comprising means for producing d-c voltage proportional to the speed of a running vehicle, means for producing d-c voltage proportional to a desired pre-selected vehicle speed, reference voltage means for comparing the difference between said produced voltages, a servomotor electrically coupled by transistor means to said voltage comparing means whereby said transistor means are actuated and, depending upon whether said comparison is greater or less than the reference voltage, a relay contact of said servomotor will be actuated thereby to achieve forward or reverse rotation of said servomotor, a control clutch having a coil circuit operatively connected between the rotatable shaft of said servomotor and the rotatable shaft of a throttle valve for effecting the engagement and disengagement therebetween, the coil circuit of the control clutch being controlled by a relay circuit, said relay circuit including a normally closed contact adapted to be opened at the time of stepping on the brake of the vehicle, a normally opened contact adapted to be closed at the time of vehicle clutch engagement and a normally opened contact adapted to be closed at the time of the top-gear engagement of said vehicle when in motion, a relay for actuating a contact placed in the circuit for forward rotation of said servomotor, and a push-button switch for driving said coil circuit, whereby the emitter current of said transistor means for driving the circuit for reverse rotation of the servomotor will be led to a point between said push-button switch and a coil through the coil circuit of the control clutch, and upon closing the push-button switch when the contacts have been closed, the relay will be actuated and the control clutch will effect the engagement between the servomotor shaft and the throttle valve shaft and the driving of said relay will result in opening the contact of the circuit for forward rotation of the servomotor, and thereafter the circuits for forward and reverse rotation of the servomotor will be placed in an active state, thus rotating the servomotor in the forward or reverse direction in accordance with the amount of the differential voltage resulting from the comparison each time such comparison is made, thereby increasing or decreasing the degree of opening of the throttle valve of the vehicle engine to accelerate or decelerate the vehicle until the vehicle speed is equal to the desired speed; and upon opening the push-button switch, the emitter current of the transistor means will energize the servomotor reverse-rotation circuit only when the latter circuit is complete and will energize the control clutch and the reverse rotation of the servomotor will decrease to the degree of opening of the throttle valve of the engine to decelerate the vehicle until the vehicle speed is equal to the desired speed.

3. A method as claimed in claim 1, which further comprises receiving from outside the vehicle an electronic signal indicative of a desired speed limit and applying said received signal to adjust the value of said second voltage to correspond to said desired speed limit.

* * * * *